United States Patent [19]

Ito

[11] 4,369,736
[45] Jan. 25, 1983

[54] INTAKE AIR HEATER

[75] Inventor: Sumio Ito, Gotenba, Japan

[73] Assignee: Toyota Jidosha Kogyo Kabushiki Kaisha, Toyota, Japan

[21] Appl. No.: 257,619

[22] Filed: Apr. 27, 1981

[30] Foreign Application Priority Data

Oct. 30, 1980 [JP] Japan ................................ 55-151391

[51] Int. Cl.³ ............................................ F02B 75/12
[52] U.S. Cl. ..................................... 123/1 A; 123/552; 123/575
[58] Field of Search .......... 123/556, 1 A, 3, DIG. 12, 123/340, 575–578, 552

[56] References Cited

U.S. PATENT DOCUMENTS

| 3,114,358 | 12/1963 | Kauffmann et al. | 123/34 |
| 3,964,457 | 6/1976 | Coscia | 123/340 |
| 3,982,517 | 9/1976 | Fales et al. | 123/552 |
| 4,031,864 | 6/1977 | Crothers | 123/1 A |
| 4,112,896 | 9/1978 | Akado et al. | 123/556 |
| 4,161,930 | 7/1979 | Bendig et al. | 123/556 |
| 4,230,072 | 10/1980 | Noguchi et al. | 123/3 |
| 4,231,343 | 11/1980 | Alf et al. | 123/556 |
| 4,295,454 | 10/1981 | Iida | 123/552 |

FOREIGN PATENT DOCUMENTS 2825367 12/1979 Fed. Rep. of Germany ...... 123/552

Primary Examiner—Charles J. Myhre
Assistant Examiner—E. Rollins Cross
Attorney, Agent, or Firm—Cushman, Darby & Cushman

[57] ABSTRACT

In an intake air heater of an engine, in which a fuel containing alcohol is employed, the amount of hot air increases, as the concentration of alcohol in the fuel increases. Although the latent heat of alcohol is about seven times as large as that of gasoline, the amount of intake air is controlled in relation to the concentration of alcohol in the fuel, so that the intake air is heated, as a function of a concentration of alcohol, using an alcohol sensor.

9 Claims, 2 Drawing Figures

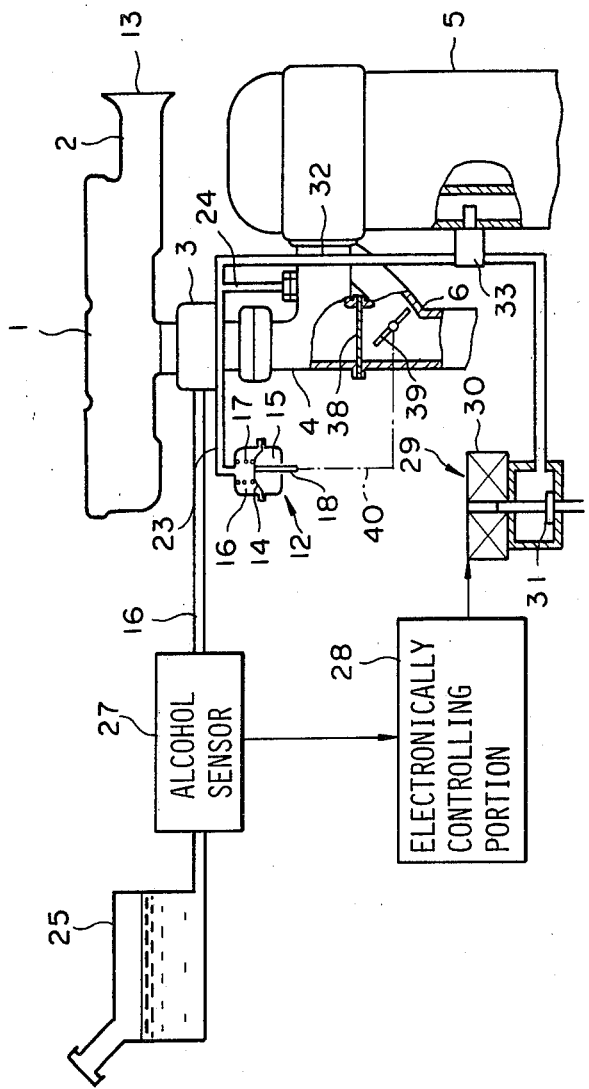

INTAKE AIR HEATER

BACKGROUND OF THE INVENTION

1. Field of the Invention

This invention relates to an intake air heater for a gasoline fuel containing alcohol.

2. Description of the Prior Art

An intake air heater controls an amount of air being heated in an intake system, so as to facilitate the warming-up of an engine when the engine is at a low temperature, as well as promote atomization of a fuel. A prior art intake air heater, however, has been confronted with a difficulty where, for example, Gashol (a gasoline containing 10% of ethyl alcohol) is used as a fuel, because the latent heat of alcohol pertaining to evaporation per a certain heating valve is about seven times as large as that of gasoline. If the amount of air being heated is determined in the same manner as for a pure gasoline fuel, i.e., independently of the concentration of alcohol, as in the prior art intake air heater, if a gasoline fuel containing alcohol is employed, poor atomization results, thus impairing the safety running of an engine.

SUMMARY OF THE INVENTION

It is accordingly an object of the present invention to provide an intake air heater, wherein good atomization of a fuel is ensured even for a gasoline fuel containing alcohol.

To attain the object, the flow rate of hot air in an intake system increases in relation to the concentration of alcohol in a fuel.

According to the present invention, the flow rate of heating exhaust gases streaming along the outer peripheral surface of an intake manifold increases in relation to a concentration of alcohol in the fuel.

Thus, heating up of the intake system increases with the concentration of alcohol in a fuel so that good atomination of the fuel is always ensured irrespective of the concentration of alcohol in the fuel.

A means for producing hot air being introduced into an intake system may be a hot-air producing space defined by a shroud surrounding an exhaust manifold. In such a hot-air producing space, air is heated by exhaust gases flowing through an exhaust manifold.

A control means may include a diaphragm mechanism and a solenoid valve for controlling the level of negative pressure in a negative pressure chamber defined by a diaphragm of the diaphragm mechanism. The solenoid valve controls an amount of air being introduced into the negative pressure chamber of the diaphragm mechanism. The control means includes a controller for controlling a duty ratio of input pulses fed into the solenoid valve, in relation to an output of an alcohol sensor. An amount of air being introduced into the negative pressure chamber changes in relation to the duty ratio of input pulses, whereby the opening of the control valve changes.

BRIEF DESCRIPTION OF THE DRAWINGS

FIGS. 1 and 2 illustrate intake-air heating devices embodying the present invention, respectively.

DESCRIPTION OF THE PREFERRED EMBODIMENTS

Figure 1:
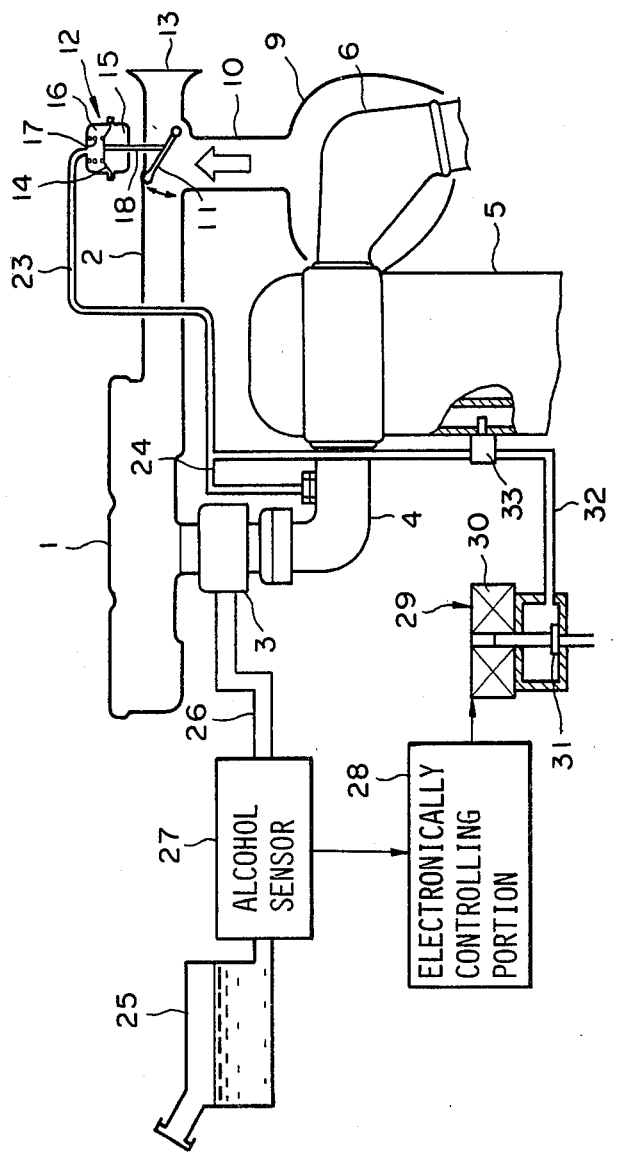

Air is introduced via a nose 2 of an air cleaner 1 into an intake system, and thence, via a carburetor 3 and an intake manifold 4 into combustion chambers in an engine body 5. Exhaust gases are released into the atmosphere via an exhaust manifold 6. A shroud 9 surrounds the exhaust manifold 6 and is connected via a passage 10 to the nose 2. A control valve 11 is provided at the junction of the passage 10 and the nose 2 and operated by a diaphragm mechanism 12, to thereby control a communication area of the passage 10. As the opening of the control valve 11 increases, an amount of hot air being introduced from the shroud 9 into the intake system increases, and on the other hand, an air being introduced from an opening 13 of the nose 2 is blocked by the control valve 11, whereas a flow rate of air from the nose is decreased. The diaphragm mechanism 12 includes an atmospheric chamber 15 and a negative pressure chamber 16 which are defined by a diaphragm 14, springs 17 adapted to urge the diaphragm 14 toward the air chamber 15, and a rod 18 piercing through the air chamber 15, with the top end thereof connected to the diaphragm 14, and with the bottom end connected to the control valve 11. The negative pressure chamber 16 is connected via a line 23 to the intake manifold 4, and an orifice 24 is provided midway of the line 23. A gasoline fuel containing alcohol is stored in a fuel tank 25 and introduced via a fuel line 26 into a float chamber of the carburetor 3. For example, there is provided on the fuel line 26 a known alcohol sensor 27 for detecting a concentration of alcohol in the fuel by a change in an electrostatic capacity of the fuel. An output of the alcohol sensor 27 is transmitted to an electronically controlling portion 28. The electronically controlling portion 28 includes a microprocessor, a read only memory (ROM) and a random access memory (RAM). The solenoid valve 29 includes a coil 30 and a valve body 31 adapted to open and close in response to the magnetic force of the coil 30. The valve body 31 is adapted to open a line 32 only when pulses are fed to the valve. The line 32 is open at one end thereof into the atmosphere and connected at the other end thereof to the line 23 on the side of negative pressure chamber 16, as viewed from the orifice 24. Besides the solenoid valve 29, a water-temperature sensing valve 33 is provided on the line 32. The water-temperature sensing valve 33 is attached to the water jacket of the engine body 5 and so arranged as to be maintained in a closed position when the engine is at a low temperature and in an open position when the engine is heated.

Since the water-temperature sensing valve 33 closes the line 32 during the warming-up of the engine, namely, when the engine is at a low temperature, then a negative pressure is supplied from the intake manifold 4 into the negative pressure chamber 16 of the diaphragm mechanism 12. As a result, the diaphragm 14 is deflected to the negative pressure chamber 16 against the force of the springs 17, and the control valve 11 is turned to substantially a fully open position, whereby air heated to elevated temperature by the exhaust manifold 6 is supplied from the shroud 9 into the intake system.

After termination of the warming-up of the engine, namely, when the engine has been heated, the water-temperature sensing valve 33 opens the line 32. The electronically controlling portion 28 receives inputs from the alcohol sensor 27, to thereby transmit to the solenoid valve 29 pulse signals in which a duty ratio becomes small as the concentration of alcohol in the fuel increases. With increase in a concentration of alcohol in the fuel, the communication area of the line 32 in the solenoid valve 29 decreases, and an amount of air being introduced into the negative pressure chamber 16 decreases in proportion thereto. Consequently, negative pressure in the negative pressure chamber 16 increases and the opening of the control valve 11 increases, whereas an amount of hot air admitted into the intake system increases. The intake system is thus maintained at a proper temperature, irrespective of increase of an alcohol matter in the fuel, ensuring good atomization of the fuel.

FIG. 2 illustrates an intake air heater in the modified form. Components equivalent to those in the first embodiment are denoted by the same reference numerals, and no description is given thereto. The lower portion of the intake-manifold gathered portion is partitioned from the upper portion of the exhaust-manifold gathered portion by a partition wall 38. A control valve 39 is provided in the exhaust-manifold gathered portion 6, and controls a flow rate of exhaust gases streaming along the partition wall 38. The flow rate of exhaust gases increases, with increase in the opening of the control valve 39. The heat-control valve 39 is connected via a link 40 to the rod 18 of the diaphragm mechanism 12. With increase in deflection of the diaphragm 14 toward the negative pressure chamber 16 in the diaphragm mechanism 12, a flow rate of exhaust gases which are introduced through the increased opening of the control valve 39 toward the partition wall 38 and move therealong, is increased, thus increasing hot air in the intake system. When the engine is heated, an amount of hot air heated by exhaust gases in the intake system increases, with increase in a concentration of alcohol in the fuel, so that the intake system can be maintained at a proper temperature, with good atomization of the fuel, irrespective of increase in an alcohol matter in the fuel.

What is claimed is:

1. An intake air heater comprising:
   an alcohol sensor for detecting the concentration of alcohol in a fuel containing alcohol;
   a control valve for controlling the flow rate of hot air being introduced into an intake system; and
   a control means responsive to said alcohol sensor for increasing the opening of said control valve as the concentration of alcohol in the fuel increases.

2. An intake air heater as defined in claim 1, wherein there is provided a hot air producing space defined by a shroud surrounding an exhaust manifold.

3. An intake air heater as defined in claim 2, wherein said control means includes a diaphragm mechanism having a diaphragm connected to said control valve, and a solenoid valve for controlling the level of negative pressure in a negative pressure chamber defined by the diaphragm of said diaphragm mechanism.

4. An intake air heater as defined in claim 3, wherein said solenoid valve controls an amount of air being introduced into the negative pressure chamber of said diaphragm mechanism.

5. An intake air heater as defined in claim 4, wherein said control means includes a controller for controlling the duty ratio of input pulses being transmitted to said solenoid valve, in association with the output of said alcohol sensor.

6. An intake air heater comprising:
   an alcohol sensor for detecting the concentration of alcohol in a fuel containing alcohol;
   a control valve adapted for controlling the flow rate of exhaust gases along the outer peripheral surface of an intake air manifold, thereby controlling the amount of hot air in said intake air manifold; and
   a control means responsive to said alcohol sensor for increasing the opening of said control valve as the concentration of alcohol increases to thereby increase the heat exchange of said hot exhaust gases with said intake air as said detected alcohol concentration increases.

7. An intake air heater as defined in claim 6, wherein said control means includes a diaphragm mechanism connected to said control valve, and a solenoid valve adapted for controlling the level of negative pressure in a negative pressure chamber defined by the diaphragm of said diaphragm mechanism.

8. An intake air heater as defined in claim 7, wherein said solenoid valve controls an amount of air being introduced into the negative pressure chamber of said diaphragm mechanism.

9. An intake air heater as defined in claim 8, wherein said control means includes a controller for controlling the duty ratio of input pulses fed into the solenoid valve, in relation to the output of said alcohol sensor.

* * * * *